Figure 1:
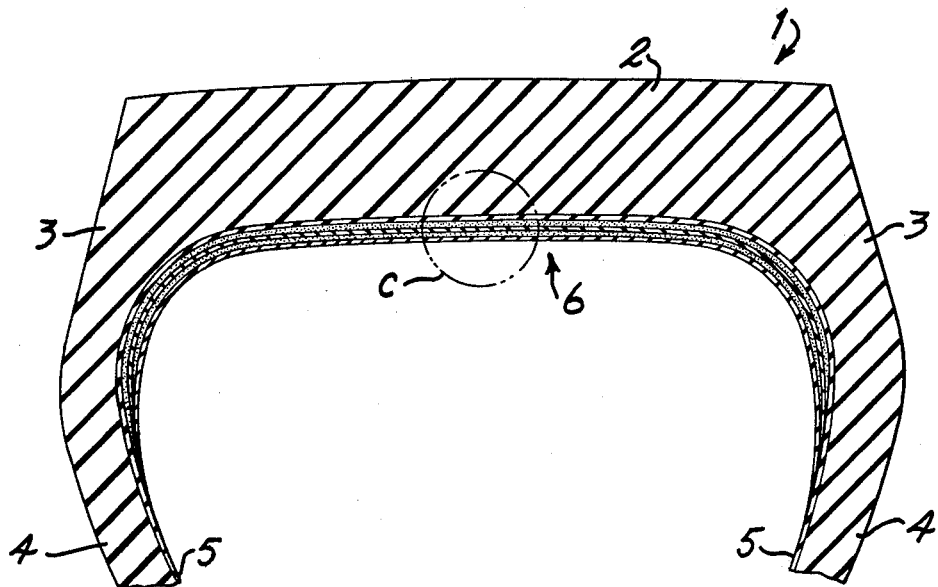

United States Patent [19]

Chautard et al.

[11] 4,239,076
[45] Dec. 16, 1980

[54] PNEUMATIC TIRE WITH PUNCTURE-SEALING LINING COMPRISING VULCANIZABLE AND VULCANIZING LAYERS

[75] Inventors: Jean Chautard, Mozac; Andre Chemizard, Clermont-Ferrand, both of France

[73] Assignee: Compagnie Generale des Etablissements Michelin, Clermont-Ferrand, France

[21] Appl. No.: 57,440

[22] Filed: Jul. 13, 1979

[30] Foreign Application Priority Data

Jul. 17, 1978 [FR] France ................ 78 21347

[51] Int. Cl.³ .............................. B60C 21/08
[52] U.S. Cl. ............................ 152/347; 156/115; 428/912; 106/33; 252/72
[58] Field of Search ........ 152/330 RF, 330 L, 330 C, 152/346–348, 330 R; 156/115; 428/912; 106/33; 252/72

[56] References Cited

U.S. PATENT DOCUMENTS

| | | |
|---|---|---|
| 3,291,333 | 12/1966 | House ........................... 428/912 X |
| 3,565,151 | 2/1971 | Courtney ........................ 152/347 |
| 3,920,061 | 11/1975 | Japp et al. ..................... 152/347 X |
| 3,952,787 | 4/1976 | Okado et al. ................... 152/347 |
| 4,003,419 | 1/1977 | Verdier .......................... 152/347 X |
| 4,037,636 | 7/1977 | Hagenbohmer et al. ........... 152/347 |
| 4,057,090 | 11/1977 | Hoshikawa et al. ............. 152/347 |
| 4,064,922 | 12/1977 | Farber et al. ................... 152/347 |
| 4,116,895 | 9/1978 | Kageyama et al. .............. 252/72 X |
| 4,149,579 | 4/1979 | Senger .......................... 152/347 |

Primary Examiner—John T. Goolkasian
Assistant Examiner—Lois E. Rodgers
Attorney, Agent, or Firm—Brumbaugh, Graves, Donohue & Raymond

[57] ABSTRACT

A tire whose inner wall is provided, below the crown of the tire and at least from one shoulder to the other of the tread, with a lining containing at least one means for sealing puncture holes is improved due to the fact that the lining comprises at least one layer of a vulcanizable sealing mixture separated by a vulcanized elastomeric partition from at least one layer of a vulcanizing mixture capable of vulcanizing the vulcanizable sealing mixture, each of the layers containing between 20% and 100% by weight of an elastomer of low molecular weight, preferably less than 30,000.

17 Claims, 3 Drawing Figures

U.S. Patent     Dec. 16, 1980     4,239,076

PNEUMATIC TIRE WITH PUNCTURE-SEALING LINING COMPRISING VULCANIZABLE AND VULCANIZING LAYERS

The present invention relates to improvements in pneumatic tires comprising means intended to seal puncture holes.

Such means can be formed of a fluid material which may possibly be mixed with granular materials and which is arranged on the inner wall of the tire. Cellular rubber has also been used in order mechanically to seal the hole, possibly in combination with a fluid material.

These arrangements, on the one hand, effect only a provisional sealing, that is to say one effective for a limited period of time, until a repairman can act. On the other hand, the placing and then dimensionally stabilizing within a tire of materials whose tendency to flow increases with the surrounding temperature and the heating of the tire during travel is a complicated matter.

For this reason, the object of the present invention is to overcome the provisional effect of the known sealing means while facilitating the manufacture and positioning of permanent sealing means in the pneumatic tire.

The principle upon which the invention is based consists in combining at least one sealing means with at least one means for vulcanizing the sealing means so that the effect of the sealing means is permanent and makes it unnecessary to remove the pneumatic tire and obtain the services of a repairman.

The invention applies to pneumatic tires whose inner wall is provided, at least in part, with a lining containing at least one means for sealing puncture holes. The invention is characterized by the fact that the lining comprises at least one layer of a vulcanizable sealing mixture separated by a vulcanized elastomeric partition from at least one layer of a vulcanizing mixture capable of vulcanizing the vulcanizable sealing mixture, each of the layers containing from 20% to 100% by weight of an elastomer of low molecular weight, preferably less than about 30,000, the layer ov vulcanizable sealing mixture being preferably placed radially outward of the layer of vulcanizing mixture so as to be adjacent the inner wall of the tire.

When a nail pierces the wall of the pneumatic tire, the vulcanizable sealing mixture flows into the hole under the effect of the inflation air which tries to escape through the hole. At the same time, the vulcanizing mixture is entrained into the hole, mixing with the vulcanizable sealing mixture. The vulcanization of the vulcanizable sealing mixture contained in the hole takes place at a given temperature arising from the heatng of the pneumatic tire during travel which is a function of the selection of the components present.

As a result of the invention, the viscosity of the two mixtures increases as the cross-linking of the elastomer of low molecular weight proceeds, commencing with the placing into contact with each other of the two mixtures, and the hole finally being permanently sealed.

The sealing effect can be increased by the incorporation into the vulcanizable sealing mixture and possibly into the vulcanizing mixture of a pulverulent, granular or fibrous filler. This filler may also serve to regulate the viscosity of one and/or the other of the two mixtures. The weight content of filler preferably does not exceed 75%. It is advantageous for the particle size of the pulverulent or granular filler to be maintained below 250 microns. Preferably also, it is advisable to use as fibrous filler fibers having a length at least equal to 0.5 mm and a diameter between 0.005 and 0.040 mm.

Variants in the carrying out of the invention may be the following, several of these variants being described subsequently in detail by way of example.

The lining in accordance with the invention is preferably separated from the body of the tire proper by a vulcanized elastomeric partition. Likewise, the lining is covered with a vulcanized elastomeric partition which separates it from the cavity of the tire which is intended to contain the inflation air. It is advantageous for at least one of these partitions to have a base of airtight butyl rubber. In this way, infiltration of inflation air into said layers is avoided.

the vulcanizable sealing mixture can have a base of an unsaturated elastomer. In this case, there can be placed adjacent to it a layer of vulcanizing mixture having a base of a saturated elastomer containing both the vulcanization agent and at least one vulcanization accelerator. However, one can also place alongside of it two layers of vulcanizing mixtures, each of these mixtures having a base of a saturated elastomer but one of them containing the vulcanization agent for the unsaturated elastomer of the vulcanizable sealing layer and the other containing at least one vulcanization accelerator. These two vulcanizing layers are separated by a vulcanized elastomeric partition.

The vulcanizable sealing mixture having a base of an unsaturated elastomer may also contain the vulcanization agent. In this case, there is placed adjacent to it a vulcanizing mixture having a base of saturated elastomer which contains at least one vulcanization accelerator.

The complex lining in accordance with the invention can be used in tires with or without separate inner tube.

For tires without inner tube, it is preferable to use airtight elastomer mixtures, for instance of butyl rubber, at least for the vulcanized elastomeric partitions covering and separating the sealing and vulcanizing mixtures. On the other hand, it is advantageous to incorporate as elastomer of low molecular weight in the sealing and/or vulcanizing mixtures an elastomer or mixture of elastomers which is also impervious to the inflation air after the vulcanization in the puncture hole.

The complex lining in accordance with the invention can be manufactured independently of the tire and then bonded cold or hot against the inner wall of the tire. However, it is advantageous to produce the complex lining prior to the building of the carcass of the tire, the elastomeric partitions separating and/or covering the layers of sealing and vulcanizing mixture being vulcanized or unvulcanized at that stage. The rest of the tire is then built on the complex lining in accordance with the invention; finally, the entire unit is simultaneously vulcanized. In the event that the complex lining is applied to the inner wall before the vulcanization of the tire, it is advantageous to incorporate, together with the elastomers of low molecular weight, on the one hand, within the vulcanizable sealing mixture a vulcanization agent which requires a period of vulcanization of the unsaturated elastomer of low molecular weight far longer than the period of vulcanization of the tire so as to avoid cross-linking of the unsaturated elastomer during the vulcanization of the tire and, on the other hand, within the vulcanizing mixture one or more vulcanization accelerators which do not react, or react only slightly, with the saturated elastomer of low molecular weight during the period of vulcanization of the tire.

EXAMPLE I

| | % by Weight |
|---|---|
| Vulcanizable Sealing Mixture: | |
| chlorinated butyl rubber of high molecular weight (about 300,000) | 20 |
| unsaturated butyl rubber of low molecular weight (about 30,000) | 61 |
| chalk | 16.2 |
| stearic acid | 1.6 |
| antioxidant | 1.2 |
| Vulcanizing Mixture: | |
| saturated polyisobutylene rubber of low molecular weight (about 15,000) | 23.4 |
| saturated polyisobutylene rubber of low molecular weight (about 2,000) | 5.9 |
| chalk | 64.7 |
| zinc oxide | 1.5 |
| sulfur | 1.5 |
| mercaptobenzothiazole | 1.2 |
| piperidine pentamethylene dithiocarbamate | 1.2 |
| antioxidant | 0.6 |

EXAMPLE II

| | % by Weight |
|---|---|
| Vulcanizable Sealing Mixture: | |
| unsaturated butyl rubber of low molecular weight (about 30,000) | 34.4 |
| carbon black | 61.7 |
| cobalt naphthenate | 0.3 |
| manganese dioxide | 1.4 |
| phenol resin | 1.7 |
| antioxidant | 0.5 |
| Vulcanizing Mixture: | |
| saturated polyisobutylene rubber of low molecular weight (about 15,000) | 35.3 |
| saturated polyisobutylene rubber of low molecular weight (about 2,000) | 8.9 |
| carbon black | 35.3 |
| parabenzoquinone dioxime | 19.9 |
| antioxidant | 0.6 |

EXAMPLE III

| | % by Weight |
|---|---|
| Vulcanizable Sealing Mixture: | |
| unsaturated polyisobutylene rubber of low molecular weight (about 15,000) | 24.0 |
| depolymerized natural rubber | 24.0 |
| carbon black | 48.0 |
| phenol formaldehyde resin | 3.2 |
| antioxidant | 0.8 |
| Vulcanizing Mixture 1: | |
| saturated polyisobutylene rubber of low molecular weight (about 15,000) | 33.5 |
| saturated polyisobutylene rubber of low molecular weight (about 2,000) | 14.3 |
| carbon black | 47.7 |
| dibenzylamine | 1.5 |
| sulfur | 1.5 |
| zinc oxide | 1.5 |
| Vulcanizing Mixture 2: | |
| saturated polyisobutylene rubber of low molecular weight (about 15,000) | 33.3 |
| saturated polyisobutylene rubber of low molecular weight (about 2,000) | 14.3 |
| carbon black | 47.6 |
| zinc isopropylxanthate | 1.4 |
| tetramethylthiuram monosulfide | 0.1 |
| phenol resin | 3.3 |

Example III illustrates a layer of vulcanizable sealing mixture combined with two layers of vulcanizing mixtures capable of vulcanizing it.

The drawing shows examples of the arrangement of the lining in accordance with the invention.

Figure 2:
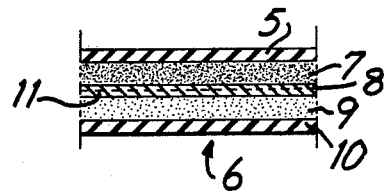
Figure 3:
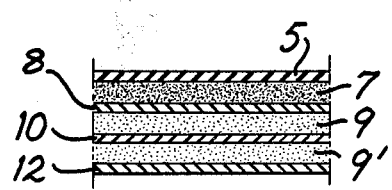

In the Drawing:

FIG. 1 shows, in meridian or transverse section, the crown of a tire provided with a lining in accordance with the invention, formed of two superimposed layers of a vulcanizable sealing mixture and a vulcanizing mixture which are separated by a vulcanized elastomeric partition equidistant from the inner wall of the tire, FIG. 2 is a view on a larger scale (taken at the circle C in FIG. 1) of a meridian or transverse section of a portion of the lining of FIG. 1, formed of two superimposed layers of a vulcanizable sealing mixture and a vulcanizing mixture which are separated by a vulcanized elastomeric partion, and FIG. 3 shows a meridian or transverse section of a portion of a lining in accordance with the invention, formed of a layer of vulcanizable sealing mixture and two layers of vulcanizing mixtures (Example III).

The crown of the tire 1 of FIG. 1 has, on both sides of the tread 2, shoulders 3 adjacent the sidewalls 4 (shown in part).

The inner wall of this tire 1 is formed of a layer 5 of elastomeric mixture which, then the tire 1 is of the type without separate inner tube is itself airtight. This layer 5 is covered, from one shoulder 3 to the other, with a lining 6 in accordance with the invention. This lining 6, as shown in FIG. 2, comprises, in succession, a layer 7 of vulcanizable sealing mixture, the characteristics of which have been specified above; a vulcanized elastomeric partition 8; a layer 9 of vulcanizing mixture, the characteristics of which have also been specified above; and finally a vulcanized elastomeric partition 10. The vulcanized elastomeric partition 8 is arranged approximately midway between the layer 5 forming the inner wall of the tire 1 and the vulcanized elastomeric partition 10 which covers the layer 9 of vulcanizing mixture. The intermediate vulcanized elastomeric partition 8 separating the two layers 7 and 9 may result from the superimposing of two layers of elastomeric mixture covulcanized to each other, as indicated by the dashed line 11. Likewise, a vulcanized elastomeric partition (not shown) may be interposed between the layer of vulcanizable sealing mixture 7 and the layer 5 forming the inner wall of the tire 1.

In FIG. 3 there is shown the layer 7 of the vulcanizable sealing mixture separated by a vulcanized elastomeric partition 8 from a first layer 9 of vulcanizing mixture. This first layer 9 of vulcanizing mixture is separated by another vulcanized elastomeric partition 10 from the second layer 9' of vulcanizing mixture. The first layer 9 of vulcanizing mixture can, for instance, contain the vulcanization agent and the second layer 9' of vulcanizing mixture can contain at least one vulcanization accelerator (Example III). A vulcanized elastomeric partition 12 covers the second layer 9'.

It is obvious that the lining in accordance with the invention may cover either the entire inner wall of the tire or only one or more portions thereof.

What is claimed is:

1. A pneumatic tire whose inner wall is provided, at least from one shoulder to the other, with a lining containing at least one means for sealing puncture holes, characterized by the fact that the lining comprises at least one layer of a vulcanizable sealing mixture separated by a vulcanized elastomeric partition from at least one layer of a vulcanizing mixture capable of vulcanizing the vulcanizable sealing mixture, each of the layers containing between 20% and 100% by weight of an elastomer of low molecular weight less than about 30,000, wherein the elastomer of the vulcanizable sealing mixture consists essentially of an unsaturated elastomer and wherein the elastomer of the vulcanizing mixture consists essentially of a saturated elastomer.

2. The tire according to claim 1, characterized by the fact that the layer of vulcanizable sealing mixture is placed radially outward of the layer of vulcanizing mixture.

3. The tire according to claim 1, characterized by the fact that at least the vulcanizable sealing mixture contains a pulverulent or granular filler, the content by weight of the filler not exceeding 75% of the weight of the vulcanizable sealing mixture.

4. The tire according to claim 3, characterized by the fact that the particle size of the pulverulent or granular filler is less than 250 microns.

5. The tire according to claim 1 or claim 2, characterized by the fact that the vulcanizable sealing mixture has a base of an unsaturated elastomer of low molecular weight and that the vulcanizing mixture has a base of a saturated elastomer of low molecular weight and contains both a vulcanization agent and at least one vulcanization accelerator.

6. The tire according to claim 1 or claim 2, characterized by the fact that the lining comprises three layers, the vulcanizable sealing mixture which forms one layer having a base of an unsaturated elastomer of low molecular weight and the vulcanizing mixtures forming the other two layers having a base of a saturated elastomer of low molecular weight, one of said vulcanizing mixtures containing a vulcanization agent and the other of said vulcanizing mixtures containing at least one vulcanization accelerator.

7. The tire according to claim 1 or claim 2, characterized by the fact that the vulcanizable sealing mixture has a base of an unsaturated elastomer of low molecular weight and contains a vulcanization agent, and by the fact that the vulcanizing mixture has a base of a saturated elastomer of low molecular weight and contains at least one vulcanization accelerator.

8. The tire according to claim 7, characterized by the fact that the vulcanization agent incorporated in the vulcanizable sealing mixture requires a period of vulcanization of the unsaturated elastomer of low molecular weight which is far longer than the period of vulcanization of the tire, and by the fact that the vulcanization accelerator or accelerators incorporated in the vulcanizing mixture do not react, or react only slightly, with the saturated elastomer of low molecular weight during the period of the vulcanization of the tire.

9. The tire according to claim 8, characterized by the fact that the unsaturated elastomer of low molecular weight is butyl rubber, the vulcanization agent is sulfur, and the vulcanization accelerator is a mixture of equal parts of mercaptobenzothiazole and piperidine pentamethylene dithiocarbamate.

10. The tire according to claim 1, characterized by the fact that the lining is covered by vulcanized elastomeric partitions, at least one of the partitions of the lining being of airtight butyl rubber.

11. The tire according to claim 1 or claim 2, characterized by the fact that the vulcanizable sealing mixture has a base of an elastomer of low molecular weight which is impervious to air after vulcanization in the puncture hole.

12. The tire according to claim 1, characterized by the fact that the lining is bonded against the inner wall of the tire.

13. The tire according to claim 1, characterized by the fact that the lining is covulcanized with the tire.

14. The tire according to claim 1, characterized by the fact that at least the vulcanizable sealing mixture contains a fibrous filler, the content by weight of the filler not exceeding 75% of the weight of the vulcanizable sealing mixture.

15. The tire according to claim 14, characterized by the fact that the fibrous filler is formed of fibers having a length at least equal to 0.5 mm and a diameter between 0.005 and 0.040 mm.

16. The tire according to claim 1 or claim 2, characterized by the fact that the vulcanizing mixture has a base of an elastomer of low molecular weight which is impervious to air after vulcanization in the puncture hole.

17. The tire according to claim 1 or claim 2, characterized by the fact that the vulcanizable sealing mixture and the vulcanizing mixture have a base of an elastomer of low molecular weight which is impervious to air after vulcanization in the puncture hole.

* * * * *